US008805093B2

(12) United States Patent
Zuev et al.

(10) Patent No.: US 8,805,093 B2
(45) Date of Patent: Aug. 12, 2014

(54) METHOD OF PRE-ANALYSIS OF A MACHINE-READABLE FORM IMAGE

(75) Inventors: Konstantin Zuev, Moscow (RU); Irina Filimonova, Moscow (RU); Sergey Zlobin, Moscow region (RU)

(73) Assignee: ABBYY Development LLC, Moscow (RU)

( * ) Notice: Subject to any disclaimer, the term of this patent is extended or adjusted under 35 U.S.C. 154(b) by 731 days.

(21) Appl. No.: 12/977,016

(22) Filed: Dec. 22, 2010

(65) Prior Publication Data

US 2011/0091109 A1  Apr. 21, 2011

Related U.S. Application Data

(63) Continuation-in-part of application No. 10/603,215, filed on Jun. 26, 2003, now Pat. No. 7,881,561.

(30) Foreign Application Priority Data

Mar. 28, 2003 (RU) ............................. 2003108433 A

(51) Int. Cl.
*G06K 9/62* (2006.01)
*G06K 9/00* (2006.01)

(52) U.S. Cl.
CPC .................................. *G06K 9/00449* (2013.01)
USPC ........................................... 382/224; 715/221

(58) Field of Classification Search
USPC ................. 382/289–297, 209, 217, 224–228; 715/221–226
See application file for complete search history.

(56) References Cited

U.S. PATENT DOCUMENTS

| 5,025,484 | A | * | 6/1991 | Yamanari et al. | 382/311 |
|---|---|---|---|---|---|
| 5,031,225 | A | | 7/1991 | Tochikawa et al. | |
| 5,050,222 | A | * | 9/1991 | Lee | 382/176 |
| 5,150,424 | A | * | 9/1992 | Aguro et al. | 382/189 |
| 5,182,656 | A | * | 1/1993 | Chevion et al. | 358/452 |
| 5,191,525 | A | * | 3/1993 | LeBrun et al. | 715/229 |
| 5,235,651 | A | | 8/1993 | Nafarieh | |
| 5,235,654 | A | | 8/1993 | Anderson et al. | |
| 5,257,328 | A | * | 10/1993 | Shimizu | 382/311 |
| 5,293,429 | A | * | 3/1994 | Pizano et al. | 382/202 |
| 5,305,396 | A | | 4/1994 | Betts et al. | |
| 5,386,508 | A | * | 1/1995 | Itonori et al. | 717/109 |
| 5,416,849 | A | * | 5/1995 | Huang | 382/173 |
| 5,461,459 | A | * | 10/1995 | Muramatsu et al. | 399/15 |

(Continued)

OTHER PUBLICATIONS

Xu et al.,"A Hierarchical Classification Model for Document Categorization", 2009, pp. 486-490, IEEE, Washington, DC, USA.

*Primary Examiner* — Aaron W Carter
(74) *Attorney, Agent, or Firm* — LeighAnn Weiland; Aditya Krishnan; Veronica Weinstein

(57) ABSTRACT

In one embodiment, the invention provides a method for a machine to perform machine-readable form pre-recognition analysis. The method comprises preliminarily assigning at least one graphic image in a form for identification of form type, preliminarily creating at least one model of the said graphic image for identification of the form type, parsing a form image into regions, determining an image form type for the form image, comprising: (a) detecting on the form image at least one of said graphic images for identification of the form type, (b) performing a primary identification of the form image type based on a comparison of the detected graphic image with the said model, and(c) performing a profound analysis using a supplementary data said-primary identification results in multiple possibilities for the form image type.

18 Claims, 3 Drawing Sheets

(56) References Cited

U.S. PATENT DOCUMENTS

| | | | |
|---|---|---|---|
| 5,463,773 A | 10/1995 | Sakakibara et al. | |
| 5,471,549 A | 11/1995 | Kurosu et al. | |
| 5,592,572 A | 1/1997 | Le | |
| 5,642,443 A | 6/1997 | Goodwin et al. | |
| 5,793,887 A * | 8/1998 | Zlotnick | 382/209 |
| 5,852,676 A * | 12/1998 | Lazar | 382/173 |
| 5,877,963 A | 3/1999 | Leung et al. | |
| 5,903,668 A | 5/1999 | Beernink | |
| 5,937,084 A * | 8/1999 | Crabtree et al. | 382/137 |
| 5,982,952 A | 11/1999 | Nakashima | |
| 6,050,490 A * | 4/2000 | Leichner et al. | 235/462.49 |
| 6,137,905 A | 10/2000 | Takaoka | |
| 6,148,119 A | 11/2000 | Takaoka | |
| 6,151,423 A | 11/2000 | Melen | |
| 6,169,822 B1 | 1/2001 | Jung | |
| 6,175,664 B1 | 1/2001 | Nakashima | |
| 6,201,894 B1 * | 3/2001 | Saito | 382/176 |
| 6,285,802 B1 | 9/2001 | Dennis et al. | |
| 6,427,032 B1 * | 7/2002 | Irons et al. | 382/306 |
| 6,481,624 B1 * | 11/2002 | Hayduchok | 235/449 |
| 6,567,628 B1 * | 5/2003 | Guillemin et al. | 399/82 |
| 6,574,375 B1 | 6/2003 | Cullen et al. | |
| 6,633,406 B1 * | 10/2003 | Imaizumi et al. | 358/1.18 |
| 6,636,649 B1 | 10/2003 | Murata et al. | |
| 6,640,009 B2 * | 10/2003 | Zlotnick | 382/224 |
| 6,687,404 B1 * | 2/2004 | Hull et al. | 382/226 |
| 6,697,091 B1 * | 2/2004 | Rzepkowski et al. | 715/835 |
| 6,732,928 B1 * | 5/2004 | Lawlor | 235/462.01 |
| 6,760,490 B1 * | 7/2004 | Zlotnick | 382/311 |
| 6,778,703 B1 * | 8/2004 | Zlotnick | 382/218 |
| 6,798,905 B1 * | 9/2004 | Sugiura et al. | 382/168 |
| 6,804,414 B1 | 10/2004 | Sakai et al. | |
| 6,825,940 B1 * | 11/2004 | Wu et al. | 358/1.15 |
| 6,952,281 B1 * | 10/2005 | Irons et al. | 358/1.15 |
| 6,993,205 B1 | 1/2006 | Lorie et al. | |
| 7,151,860 B1 | 12/2006 | Sakai et al. | |
| 7,215,828 B2 | 5/2007 | Luo | |
| 7,251,380 B2 | 7/2007 | Zuev et al. | |
| 7,305,619 B2 * | 12/2007 | Kaneda et al. | 715/273 |
| 7,610,315 B2 | 10/2009 | Chang et al. | |
| 7,644,052 B1 | 1/2010 | Chang et al. | |
| 7,672,940 B2 * | 3/2010 | Viola et al. | 707/999.006 |
| 7,881,561 B2 | 2/2011 | Zuev et al. | |
| 2002/0065847 A1 * | 5/2002 | Furukawa et al. | 707/505 |
| 2002/0106128 A1 * | 8/2002 | Zlotnick | 382/224 |
| 2002/0159639 A1 * | 10/2002 | Shima | 382/218 |
| 2003/0086721 A1 * | 5/2003 | Guillemin et al. | 399/82 |
| 2003/0126147 A1 * | 7/2003 | Essafi et al. | 707/100 |
| 2003/0160095 A1 * | 8/2003 | Segal | 235/375 |
| 2003/0197882 A1 * | 10/2003 | Tsukuba et al. | 358/1.12 |
| 2004/0161149 A1 * | 8/2004 | Kaneda et al. | 382/181 |
| 2004/0162831 A1 * | 8/2004 | Patterson | 707/100 |
| 2006/0028684 A1 * | 2/2006 | Namizuka et al. | 358/1.16 |
| 2006/0104511 A1 * | 5/2006 | Guo et al. | 382/176 |
| 2006/0274941 A1 | 12/2006 | Zuev et al. | |
| 2007/0059068 A1 * | 3/2007 | Winter | 399/367 |
| 2008/0059448 A1 | 3/2008 | Chang et al. | |
| 2008/0152237 A1 | 6/2008 | Sinha et al. | |
| 2009/0097071 A1 * | 4/2009 | Tsukuba et al. | 358/1.18 |
| 2009/0138466 A1 | 5/2009 | Henry et al. | |
| 2009/0154778 A1 | 6/2009 | Lei et al. | |
| 2009/0228777 A1 | 9/2009 | Henry et al. | |
| 2011/0188759 A1 | 8/2011 | Filimonova et al. | |

* cited by examiner

METHOD OF PRE-ANALYSIS OF A MACHINE-READABLE FORM IMAGE

This application is a continuation-in part of U.S. patent application Ser. No. 10/603,215 titled "Pre-Analysis of a Machine-Readable Form Image", filed on Jun. 26, 2003.

TECHNICAL FIELD

The present invention relates generally to an optical character pre-recognition of machine-readable forms, and in particular to bit-mapped image and one or more model matching methods, mid also image spatial direction identification.

BACKGROUND

According to widely known methods of text pre-recognition a bit-mapped image is parsed into regions, containing text and/or non-text regions, with the further dividing said text regions into objects, containing strings, words, character groups, characters etc.

Some known methods uses preliminarily document type identification for narrowing a list of possible documents types, examined in an analysis of the document logical structure According to this group of methods the document type identification is an independent step of document analysis, forestalling logical structure identification. At that the document type and its properties list become defined up to the moment of defining the logical structure thereof. Or wise versa, a document structure identification may be an integral part of logical structure identification process. In this case the document type that fits closer the analyzed image is selected.

A spatial orientation direction verification is present in a number of documents.

In the U.S. Pat. No. 5,031,225 (Jul. 9, 1991, Tochikawa et al.) is disclosed a method of document image spatial orientation verification, using a preliminarily assigned character, to be found in the document. The found character is recognized to fit one of the 4 models thereof, corresponding with four possible directions.

The most reliably matching model indicates the orientation direction of the image.

The method causes a mistake in the case of possible different directions of text orientation to be present in the document. It also may cause mistake if the character is not reliably recognized after converting into image state.

In the U.S. Pat. No. 5,235,651 (Aug. 10, 1993, Nafarieh) the orientation direction of the image is estimated via setting up and accepting a hypothesis on the level of initial image units by analyzing the transition from dark points (pixels) and regions to light ones and wise versa. If the examined hypothesis is not accepted, the new one is set up, considering the image to be turned at 90. degree. angle.

The method can't work if various orientation directions of text can be present on the form.

In the U.S. Pat. No. 5,471,549 (Nov. 28, 1995, Kurosu et al.) to define the image orientation direction the text characters are selected from the text one after another and are tried to recognize, supposing orientation direction to be 0. degree., 90. degree., 180. degree., 270. degree. The direction of the best matching is assumed as the right document image orientation.

The method can't work if various orientation directions of text can be present on the form as in the previous example.

In the U.S. Pat. No. 5,592,572 (Jan. 7, 1997, Le) the problem is solved by dividing the image into a large amount of objects, either Of text or non-text types. Then the orientation of all initial objects is estimated via recognition of characters, with the further joining them into large ones and estimating the orientation thereof. Finally there is the only text object, covering the whole text field with the corresponding orientation estimation.

The main shortcoming of the method lies in that the orientation estimation is performed along with recognition of text portions, thus reducing the method output.

In the U.S. Pat. No. 6,137,905 (Oct. 24, 2000, Takaoka) and U.S. Pat. No. 6,148,119 (Nov. 14, 2000, Takaoka) the orientation direction is estimated by dividing the image into a plurality of regions, possessing various estimation weight coefficient. Then the orientation direction is estimated via the text recognition in the said regions. The total direction is estimated as a sum of particular ones together with their weight coefficients.

The shortcoming of the method is the low method output, depending greatly upon the recognition results.

In the U.S. Pat. No. 6,169,822 (Jan. 2, 2001, Jung) the predetermined portion of the text is parsed from the image and is performed (processed) recognition. In the case of recognition failure, the inference is made about the other orientation direction of the image To achieve the reliable result via the said method the large number of text portions are to be recognized. That surely reduces the method output.

SUMMARY OF THE INVENTION

One or more objects of the form are assigned thereon, composing graphic image, unambiguously defining its direction of spatial orientation. The said graphic image properties comprise a description of a special model for defining the direction of spatial orientation. Identification of the image with the said model the right direction of image spatial orientation is defined. The said model properties are stored in a special data storage means, one of the embodiment of which is the form image model description.

In the similar way one or more form objects are assigned thereon, composing graphic image, unambiguously defining its type. Additionally one or more form objects may be assigned, for the case of profound form type analysis, if two or more forms are close in appearance or in properties list. The graphic image properties comprise description of a special model for form type definition. The said model properties are stored in a special data storage means, one of the embodiment of which is a form model description.

After converting the form image is parsed into regions containing text images, data input fields, special reference points, lines and other objects.

The possible distortion, caused by the document conversion to electronic state, is eliminated from the image.

Objects, comprising the graphic image for spatial orientation verification, are identified on the form image. The orientation direction accuracy is verified and corrected if necessary.

The objects, comprising the graphic image for form type definition, are identified on the form image. The proper model is selected via identification of the said graphic image. In the case of multiple identification result, the profound analysis of the form type is performed. The profound analysis is performed in the similar way adding the supplementary objects to the graphic image and performing new identification.

The profound analysis is performed automatically or fully or partly manually.

DETAILED DESCRIPTION

Broadly, one embodiment of the present invention disclose a method for a machine to perform machine-readable form pre-recognition analysis, as will be described.

The document logical structure examination requires dividing the document image into elements of different types. The single element of the document can contain its title, authors name, date of the document or the main text etc. The composition of the document elements depends upon its type. The document logical structure is performed by the following ways:
  on the base of fixed elements location,
  using a table or multi-column structure [1], [5], [6],
  on the base of structural images identification [4],
  via specialized methods for special documents types [3].

Methods of the first group requires fixed structural elements location and are used for fields mark out, i.e. image regions, containing elements for documents of standard form [2]. The exact elements location on the form may be distorted by scanning. The distortion may be of various kinds: shift, a small turn angle, a compression and stretching, a large turn angle.

All kinds of distortion are eliminated on the first stage of document image processing.

The coordinates of regions may be founded relatively to:
  image edges,
  special reference points,
  remarkable form elements,
  a correlation function, taking into account of all or a part of the listed above.

Sometimes, the distortion may be ignored due to its negligibility. Then the image coordinates are computed relatively to the image edges.

Figure 1:
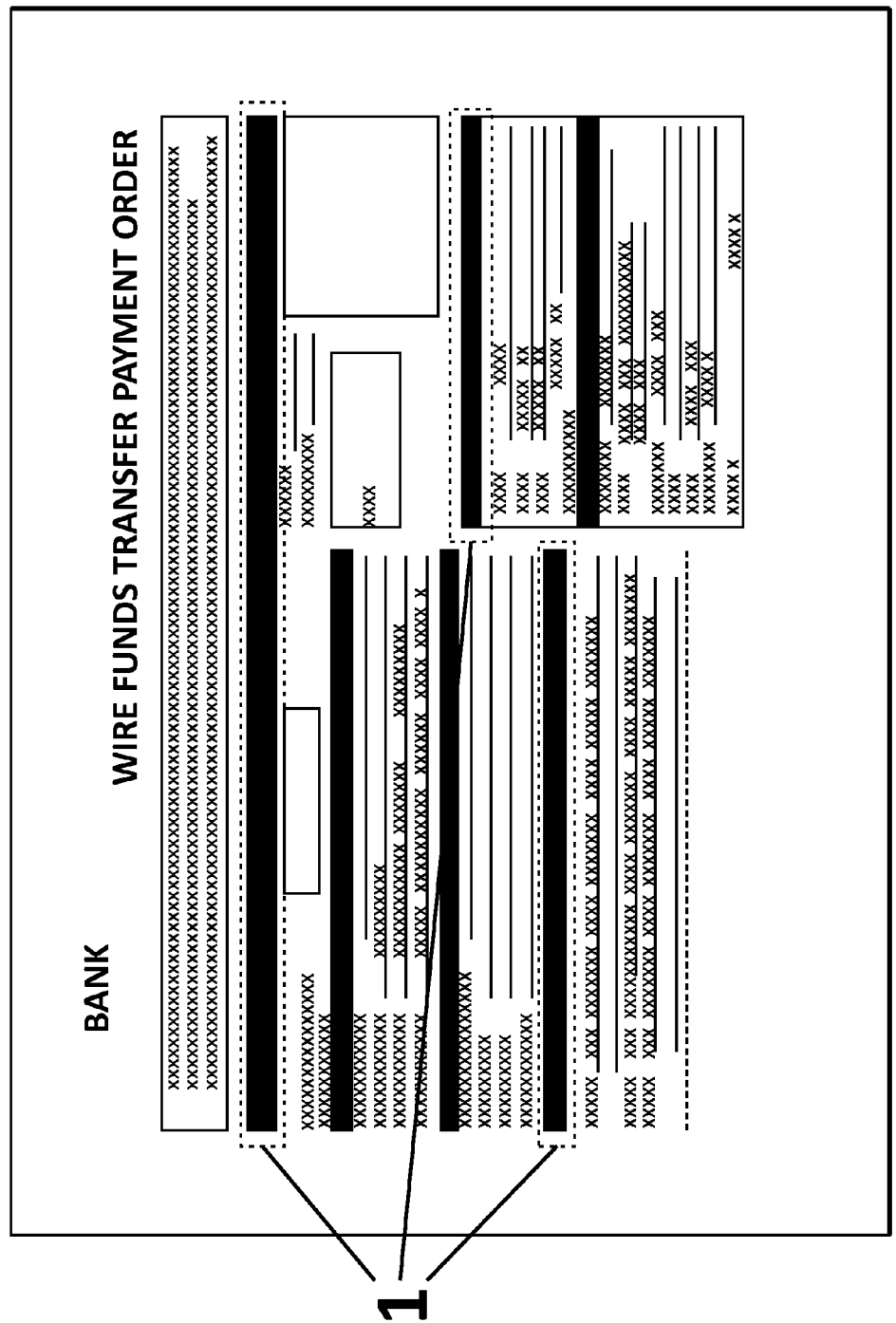
FIG. 1 shows a document with three assigned elements comprising graphic image.
Figure 2:
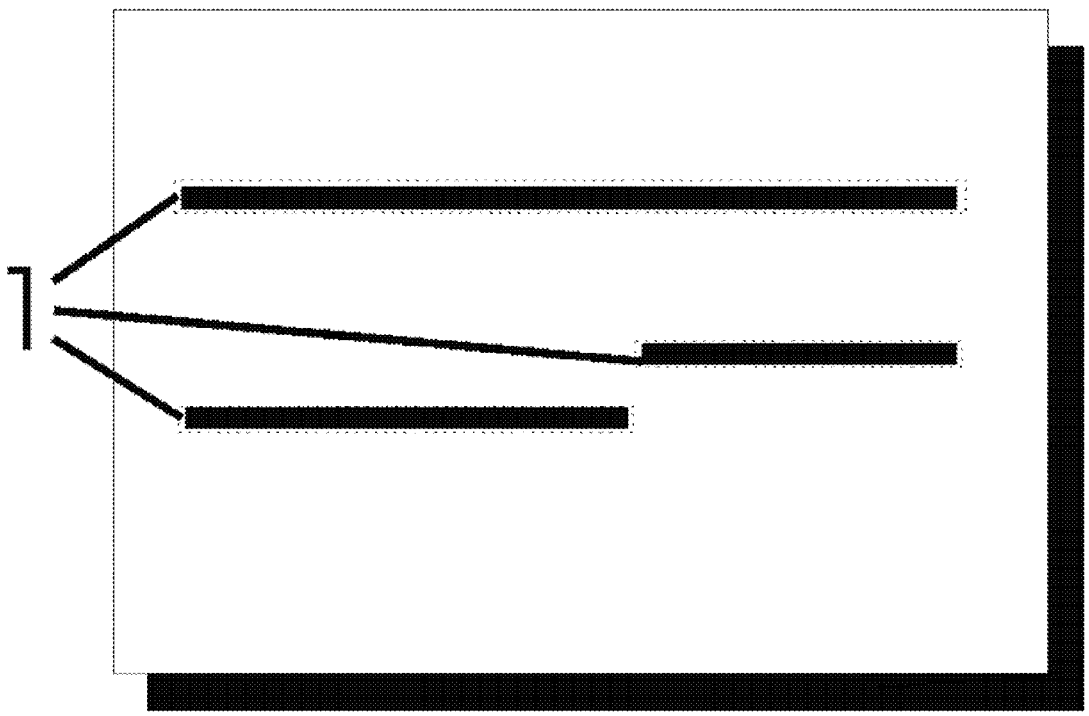
FIG. 2 shows the graphic image, formed by assigned elements.
Figure 3:
FIG. 3 shows some examples of graphic objects used as assigned elements comprising graphic image.

The most of the methods for form type identification uses special graphic objects that are reliably identified reference points, as black squares or rectangles, a short dividing lines composing cross or corner (FIG. 3) etc. Searching the reference points location combination as an image using the special models, the type of the analyzed form can be correctly defined.

The main technical result of the invention consists in gaining
  universality of the pre-recognition analysis of machine-readable forms,
  ability to process documents' images of more then one form type in one session,
  ability to process documents images of different directions of spatial orientation,
  ability to perform the pre-recognition process with high output.

The said technical result is achieved in the following way.

One or more objects (1) are assigned on the form, composing graphic image (2), unambiguously defining its direction of spatial orientation. The said graphic image properties are described in a special model used for defining the direction of spatial orientation. Identification of the said image via the said model the right direction of image spatial orientation is defined. The said special model properties are stored in a special data storage means, one of the embodiment of which is the form image model description.

In the similar way one or more form objects (1) are assigned, composing graphic image (2) on the form, unambiguously defining its type. Additionally one or more supplementary form objects may be assigned for profound form type analysis, if two or more forms are close in appearance or in properties list. The graphic image properties is described of an another special model used for form type definition. The said another special model properties are stored in a special data storage means, one of the embodiment of which is a form model description.

After converting to electronic state the form image is parsed into regions containing text objects images, data input fields, special reference points, lines and other objects.

The possible distortion, caused by the document conversion to electronic state, is eliminated from the image.

The objects, comprising the graphic image for spatial orientation verification, are identified on the form image. The orientation direction accuracy is verified and corrected if necessary.

The objects, comprising the graphic image for form type definition, are identified on the form image. The matching model is selected via identification of the said graphic image. In the case of multiple identification result, the profound analysis of the form type is performed. The profound analysis comprises creation of a new special model for form type identification containing primary special model plus one or more supplementary form objects. The image is performed a supplementary identification using new special model.

The profound analysis may be performed fully or partly automatically.

One or more form objects, comprising the graphic image is described in a form of that includes all alternatives or variants of the form objects.

Figure 4:
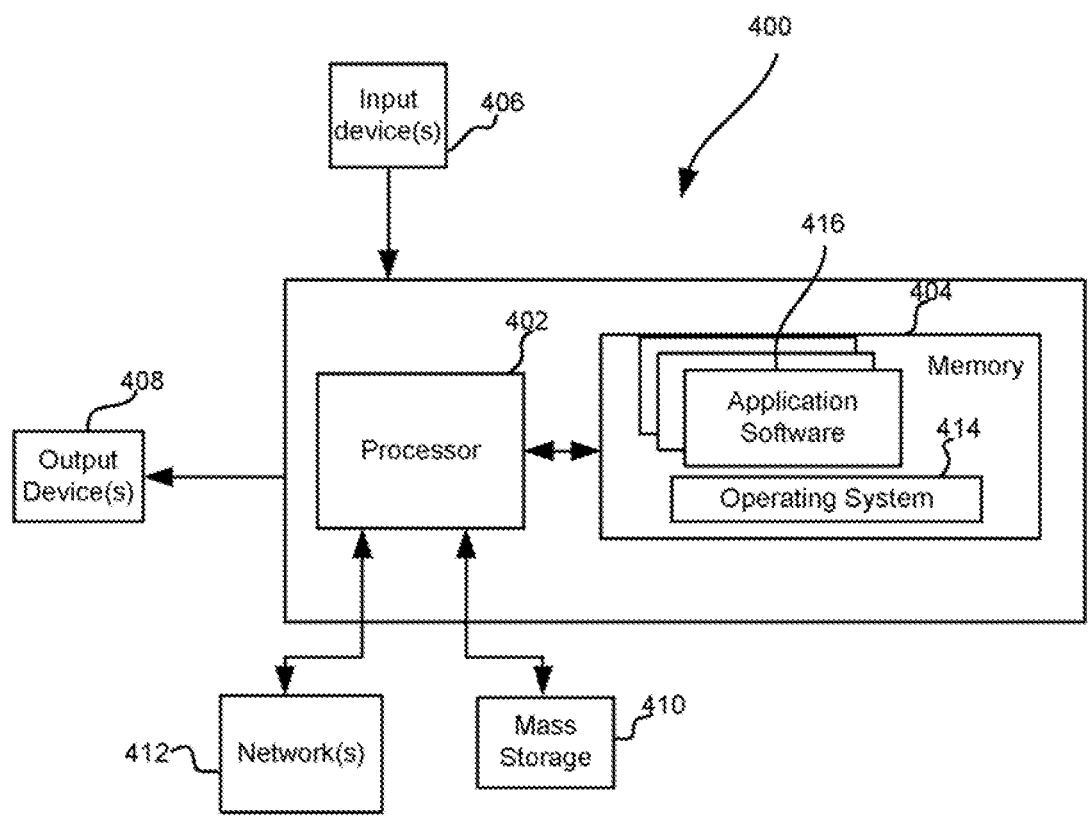
FIG. 4 shows a high-level block diagram of hardware for implementing a system for performing pre-recognition analysis, in accordance with one embodiment of the invention.

Embodiments of the present invention also disclose a machine or system for performing the pre-recognition analysis. FIG. 4 shows exemplary hardware for implementing such a machine for system, in accordance with an embodiment of the present disclosure.

Referring to FIG. 4, the hardware 400 typically includes at least one processor 402 coupled to a memory 404. The processor 402 may represent one or more processors (e.g. microprocessors), and the memory 404 may represent random access memory (RAM) devices comprising a main storage of the hardware 400, as well as any supplemental levels of memory, e.g., cache memories, non-volatile or back-up memories (e.g. programmable or flash memories), read-only memories, etc. in addition, the memory 404 may be considered to include memory storage physically located elsewhere in the hardware 400 e.g. any cache memory in the processor 402 as well as any storage capacity used as a virtual memory, e.g., as stored on a mass storage device 410.

The hardware 400 also typically receives a number of inputs and outputs for communicating information externally. For interface with a user or operator, the hardware 400 may include one or more user input devices 406 (e.g., a keyboard, a mouse, imaging device, scanner, etc.) and a one or more output devices 408 (e.g., a Liquid Crystal Display (LCD) panel, a sound playback device (speaker). To embody the present invention, the hardware 400 must include at least one screen device.

For additional storage, the hardware 400 may also include one or more mass storage devices 410, e.g., a floppy or other removable disk drive, a hard disk drive, a Direct Access Storage Device (DASD), an optical drive (e.g. a Compact Disk (CD) drive, a Digital Versatile Disk (DVD) drive, etc.) and/or a tape drive, among others. Furthermore, the hardware 400 may include an interface with one or more networks 412 (e.g., a local area network (LAN), a wide area network (WAN), a wireless network, and/or the Internet among others) to permit the communication of information with other computers coupled to the networks. It should be appreciated that the hardware 400 typically includes suitable analog and/or digital interfaces between the processor 402 and each of the components 404, 406, 408, and 412 as is well known in the art.

The hardware 400 operates under the control of an operating system 414, and executes various computer software applications, components, programs, objects, modules, etc. to implement the techniques described above. In particular, the computer software applications will include the client dictionary application, in the case of the client user device 402. Moreover, various applications, components, programs, objects, etc., collectively indicated by reference 416 in FIG. 4, may also execute on one or more processors in another computer coupled to the hardware 400 via a network 412, e.g. in a distributed computing environment, whereby the processing required to implement the functions of a computer program may be allocated to multiple computers over a network.

In general, the routines executed to implement the embodiments of the invention may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD-ROMs), Digital Versatile Disks (DVDs), (lash memory, etc.), among others. Another type of distribution may be implemented as Internet downloads.

While certain exemplary embodiments have been described and shown in the accompanying drawings, it is to be understood that such embodiments are merely illustrative and not restrictive of the broad invention and that this invention is not limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principals of the present disclosure.

The invention claimed is:

1. A method for a machine to perform machine-readable form pre-recognition analysis comprising:
    preliminarily assigning at least one graphic image in a form for identification of form type;
    preliminarily creating at least one model of the said graphic image for identification of the form type; and
    determining an image form type for a form image, comprising:
        detecting on the form image at least one of said graphic images for identification of the form type,
        performing a primary identification of the form image type based on a comparison of the detected graphic image with the said model, and
        performing a profound analysis using a supplementary data when said primary identification results in multiple possibilities for the form image type,
        wherein the profound analysis comprises:
            assigning to the form at least one supplementary form element;
            creating a profound analysis model using the said model of the said graphic image plus at least one said supplementary assigned form element; and
            performing the profound analysis of the form image using said profound analysis model.

2. The method as recited in claim 1, wherein determining the form image type comprises setting up and examining hypotheses and corresponding matching reliability estimations.

3. The method as recited in claim 1, wherein determining the form image type is performed using a minimum possible set of objects, defining the form type.

4. The method as recited in claim 1, wherein the at least one graphic image comprises a non-text image.

5. The method as recited in claim 1, wherein the at least one graphic image comprises a text image.

6. The method as recited in claim 5, wherein said text image is additionally recognized as a first step in the pre-recognition analysis.

7. The method as recited in claim 6, wherein the recognized text is used as supplementary data in a form type definition process.

8. The method as recited in claim 2, wherein the matching reliability estimation is performed on all steps of the pre-recognition analysis.

9. The method as recited in claim 1, wherein assigning comprises assigning a group of graphic images.

10. The method as recited in claim 4, wherein at least one form object comprises an element of empty region type.

11. The method as recited in claim 4, wherein at least one form object is of dividing line type.

12. The method as recited in claim 1, wherein the profound analysis is performed using any other supplementary data.

13. The method as recited in claim 9, wherein the entire group of graphic images is used for determining the form type.

14. The method as recited in claim 1, wherein the said graphic image is used for identifying the form type.

15. The method as recited in claim 1, further comprising
    parsing the form image into regions, wherein the regions contain at least one of text objects images, data input fields, special reference points, and lines.

16. A system, comprising:
    a processor; and a memory coupled to the processor, the memory storing instructions which when executed by the processor, cause the system to perform a method for machine-readable form pre-recognition analysis comprising:
preliminarily assigning at least one graphic image in a form for identification of form type,
preliminarily creating at least one model of the said graphic image for identification of the form type, and
determining an image form type for the form image, comprising:
  detecting on the form image at least one of said graphic images for identification of the form type,
  performing a primary identification of the form image type based on a comparison of the detected graphic image with the said model, and
  performing a profound analysis using a supplementary data when said primary identification results in multiple possibilities for the form image type, wherein the profound analysis comprises:
    assigning to the form at least one supplementary form element:
    creating a profound analysis model using the said model of the said graphic image plus at least one said supplementary assigned form element; and
    performing a profound analysis of the form image using said profound analysis model.

17. The system as recited in claim 16, wherein determining the form image type comprises setting up and examining hypotheses and corresponding matching reliability estimations.

18. The system as recited in claim 16, wherein determining the form image type is performed using a minimum possible set of objects, defining the form type.

* * * * *